(12) United States Patent
Cardno et al.

(10) Patent No.: US 6,622,084 B2
(45) Date of Patent: Sep. 16, 2003

(54) TRAVEL ROUTE PLANNER SYSTEM AND METHOD

(75) Inventors: Andrew John Cardno, Wellington (NZ); Nicholas John Mulgan, Wellington (NZ)

(73) Assignee: Compudigm International Limited, Wellington (NZ)

( * ) Notice: Subject to any disclaimer, the term of this patent is extended or adjusted under 35 U.S.C. 154(b) by 0 days.

(21) Appl. No.: 10/061,762

(22) Filed: Feb. 1, 2002

(65) Prior Publication Data

US 2002/0128767 A1 Sep. 12, 2002

Related U.S. Application Data (63) Continuation of application No. PCT/NZ01/00105, filed on Jun. 5, 2001.

(51) Int. Cl.[7] ............................ G01C 21/00; G06F 17/60
(52) U.S. Cl. ........................... 701/202; 701/200; 705/5; 705/6
(58) Field of Search ................................. 701/200, 201, 701/202, 25, 26; 705/5, 6, 13

(56) References Cited

U.S. PATENT DOCUMENTS

| | | |
|---|---|---|
| 4,862,357 A | 8/1989 | Ahlstrom et al. |
| 5,021,953 A | 6/1991 | Webber et al. |
| 5,272,638 A * | 12/1993 | Martin et al. ............... 364/444 |
| 5,331,546 A | 7/1994 | Webber et al. |
| 5,732,398 A | 3/1998 | Tagawa |
| 5,832,453 A | 11/1998 | O'Brien |
| 5,948,040 A | 9/1999 | DeLorme et al. ........... 701/201 |
| 6,009,403 A | 12/1999 | Sato |
| 6,018,715 A | 1/2000 | Lynch |

FOREIGN PATENT DOCUMENTS

| | | |
|---|---|---|
| JP | 11053447 | 2/1999 |
| JP | 11143977 | 5/1999 |

* cited by examiner

*Primary Examiner*—Yonel Beaulieu
(74) *Attorney, Agent, or Firm*—Dorsey & Whitney LLP (57) ABSTRACT

The present invention provides a method of planning a travel route including maintaining in a memory a reference database comprising one or more travel data sets, each travel data set representing a travel option from a travel origin to a travel destination and including an origin identifier and a destination identifier, obtaining one or more travel preferences for a travel route from a user, retrieving one or more travel data sets from the reference database to construct one or more candidate travel plans, calculating a plurality of penalty values based on the user travel preferences, each penalty value associated with a corresponding travel data set, and selecting one or more candidate travel plans so as to minimize the sum of penalty values associated with the travel data sets of a candidate travel plan. The present invention encompasses hardware, software and firmware suitable to accomplish the method.

31 Claims, 10 Drawing Sheets

| ID | Origin | Destination | Departure Time | Arrival Time | Airline | Kosher |
|---|---|---|---|---|---|---|
| | | | | | | |
| | | | | | | |

FIGURE 3

| Customer ID | Travel Plan ID | Travel Characteristic | User Significance |
|---|---|---|---|
| Customer 1 | Travel 1 | Flight from Melbourne to NY | 9 |
| Customer 1 | Travel 1 | Via Hawaii | 6 |
| Customer 1 | Travel 1 | Via Florida | 6 |
| Customer 1 | Travel 1 | No stopover greater than 90 minutes | 7 |
| Customer 1 | Travel 1 | All stopovers in afternoon | 6 |
| Customer 1 | Travel 1 | If stopover > 90 mins, then overnight stopover at hotel within 2 km of airport | 7 |
| Customer 2 | Travel 1 | Wheelchair access | 10 |

TRAVEL ROUTE PLANNER SYSTEM AND METHOD

The above-identified application is a Continuation of International Application Number PCT/NZ01/00105, filed on Jun. 5, 2001, which claims priority to New Zealand Application Number 504934, filed on Jun. 2, 2000.

FIELD OF INVENTION

The invention relates to a travel route planner system and method.

BACKGROUND TO INVENTION

It is a difficult task to arrange complex travel plans for individual users. Such users often have several preferances of varying importance to the user. It would be desirable to construct a suitable travel plan for a user automatically based on these preferences.

SUMMARY OF INVENTION

In broad terms the invention comprises a method of planning a travel route comprising the steps of maintaining in a memory a reference database comprising one or more travel data sets, each travel data set representing a travel option from a travel origin to a travel destination and comprising an origin identifier and a destination identifier; obtaining one or more travel preferences for a travel route from a user; retrieving one or more travel data sets from the reference database to construct one or more candidate travel plans; calculating a plurality of penalty values based on the user travel preferences, each penalty value associated with a corresponding travel data set; and selecting one or more candidate travel plans so as to minimise the sum of penalty values associated with the travel data sets of a candidate travel plan.

In broad terms in another form the invention comprises a travel route planner comprising a memory in which is stored a reference database comprising one or more data sets, each data set representing a travel option from a travel origin to a travel destination and comprising an origin identifier and a destination identifier; a data entry component arranged to obtain one or more travel preferences for a travel route from a user; a retrieval component arranged to retrieve one or more travel data sets from the reference database to construct one or more candidate travel plans; a penalty calculator arranged to calculate a plurality of penalty values based on the user travel preferences, each penalty value associated with a corresponding travel data set; and a selection component arranged to select one or more candidate travel plans so as to minimise the sum of penalty values associated with the travel data sets of a candidate travel plan.

In another form in broad terms the invention comprises a travel route planner computer program comprising a reference database comprising one or more travel data sets, each travel data set representing a travel option from a travel origin to a travel destination and comprising an origin identifier and a destination identifier; a data entry form programmed to obtain one or more travel preferences for a travel route from a user; a retrieval query programmed to retrieve one or more travel data sets from the reference database to construct one or more candidate travel plans; a penalty calculation function programmed to calculate a plurality of penalty values based on the user travel preferences, each penalty value associated with a corresponding travel data set; a selection algorithm programmed to select one or more candidate travel plans so as to minimise the sum of penalty values associated with the travel data sets of a candidate travel plan.

BRIEF DESCRIPTION OF THE FIGURES

Preferred forms of the travel route planner system and method will now be described with reference to the accompanying Figures in which.

DETAILED DESCRIPTION OF PREFERRED FORMS

Figure 1:
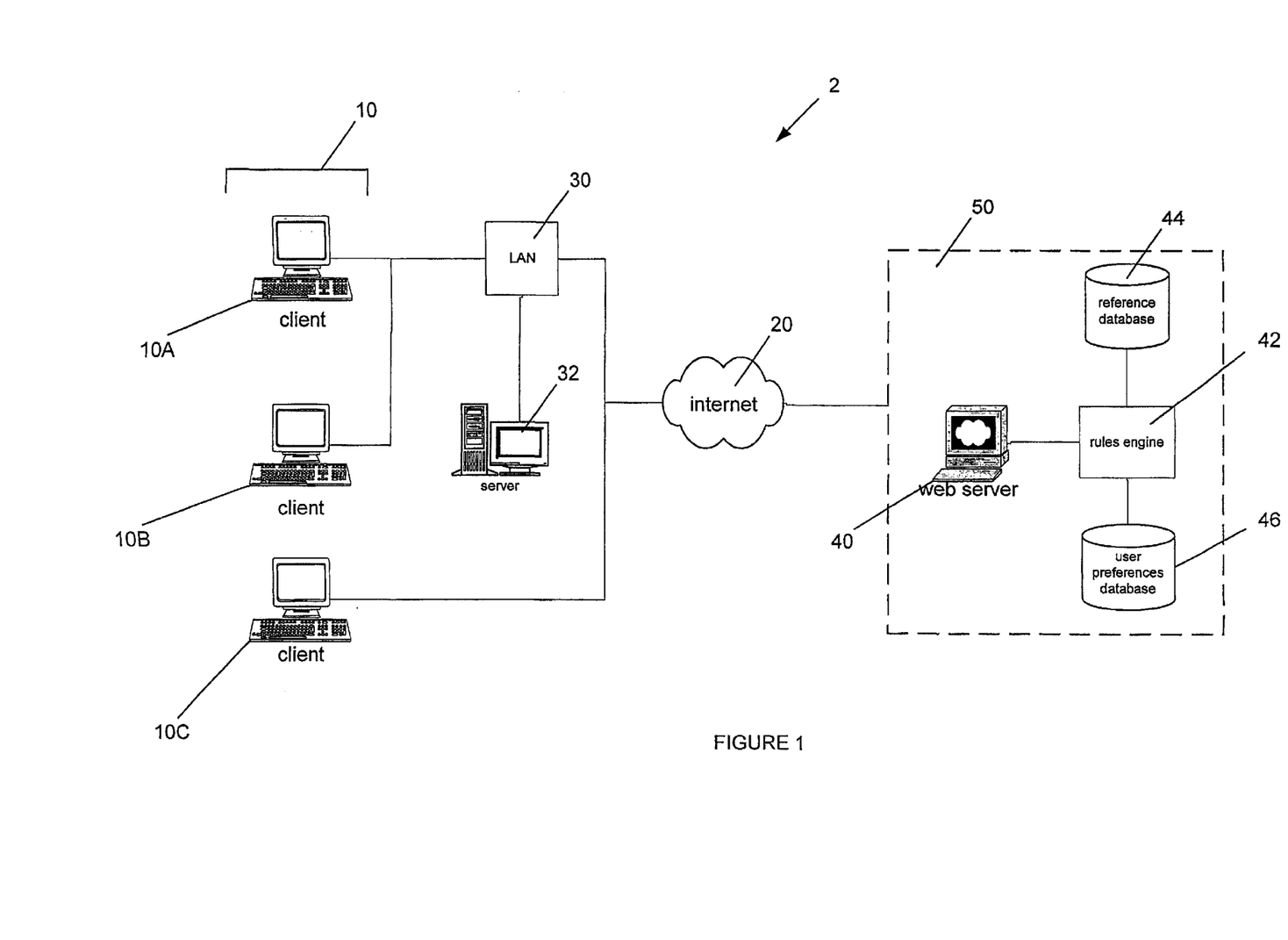
FIG. 1 shows a block diagram of an Internet-based system in which the invention may be implemented.

FIG. 1 illustrates a block diagram of the preferred Internet-based system 2 in which the present invention may be implemented. The system includes one or more clients 10, for example clients 10A, 10B and 10C, which may each comprise a personal computer or workstation which will be described below. Each client 10 is preferably interfaced to the Internet 20. As shown in FIG. 1, each client 10 could be connected directly to the Internet with a suitable dial-up connection or could be connected through a local area network or LAN. Client 10C is shown connected to the Internet 20 with a dial-up connection. Clients 10A and 10B, on the other hand, are connected to a network 30, such as a local area network or LAN. The network 30 could be connected to a suitable network server 32 and communicate with the Internet 20 as shown.

The system 2 in one preferred form further comprises a web server 40 connected to the Internet 20. The web server 40 preferably comprises a personal computer or workstation operating under the control of suitable software. The web server 40 is connected to or alternatively has stored on it a rules engine 42, a reference database 44 and a user preferences database 46. The web server 40, the rules engine 42, the reference database 44 and the user preferences database 46 collectively comprise the invention as shown at 50.

Figure 2:
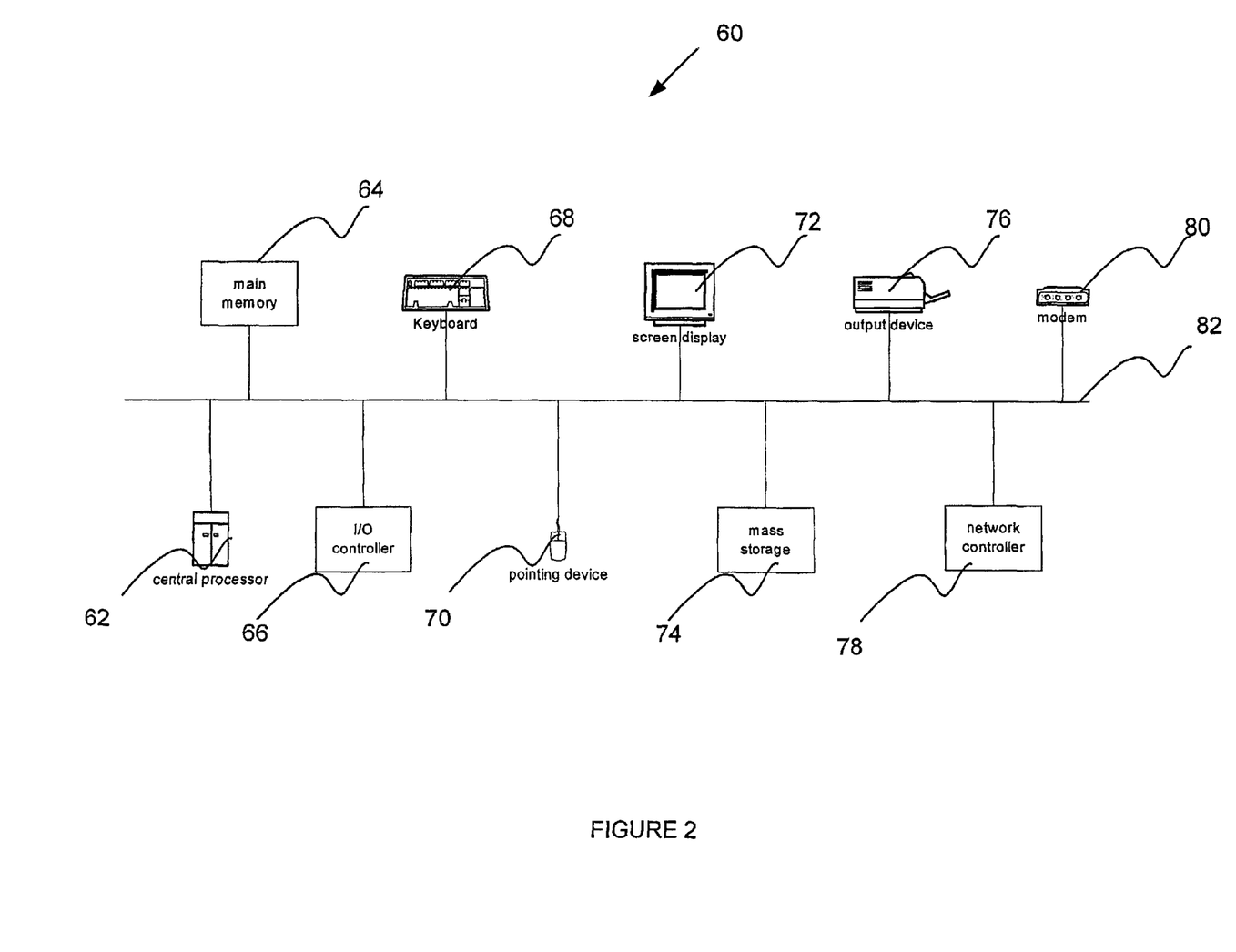
FIG. 2 shows the preferred system architecture of hardware on which the present invention may be implemented.

FIG. 2 shows the preferred system architecture of a client 10 and/or web server 40 computer or workstation. Each computer system 60 typically comprises a central processor 62, a main memory 64, an input/output controller 66, a keyboard 68, a pointing device 70 for example a mouse, a display or screen device 72, a mass storage 74 for example a hard disk, floppy disk or optical disc, and an output device 76 for example a printer. The computer system 60 could also include a network interface card or controller 78 and/or a modem 80. The individual components of the computer system 60 could communicate through a system bus 82.

Figure 3:
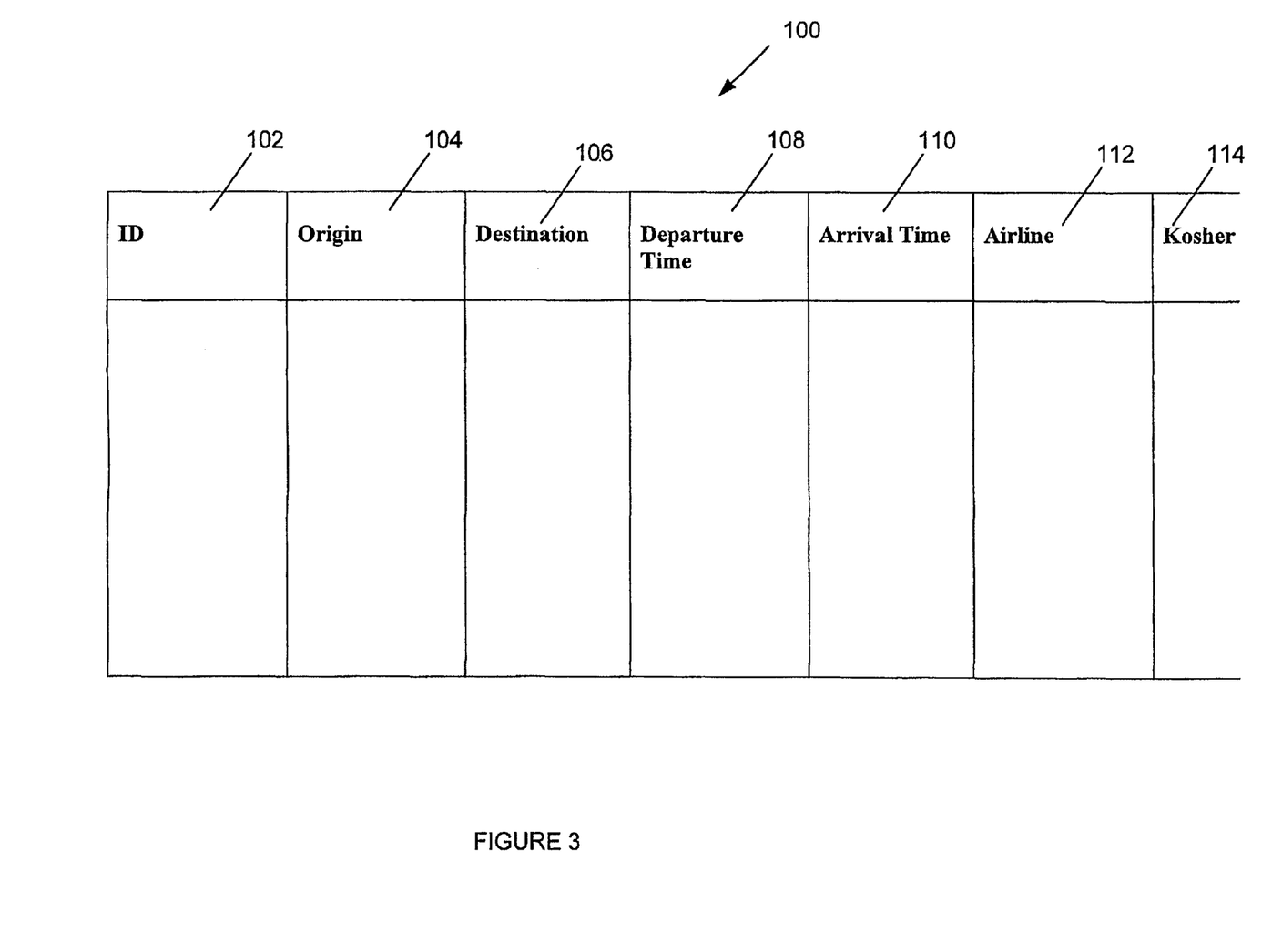
FIG. 3 is an example of a preferred database schema for the reference database.

FIG. 3 illustrates a preferred database schema 100 for the reference database 44. The reference database 44 is arranged to store details of available flights, storing various travel options between locations. Each travel option could represent a user itinerary, or could represent a portion or leg of the journey described in the itinerary. The reference database 44 could be maintained by a third party, for example a travel agency or airline. The preferred database schema could include for example a flight identifier 102, a place of origin 104 and a destination 106. The preferred schema could also include the departure time 108 of the flight in the time zone of the place of origin, and the arrival time 110 of the flight in the time zone of the place of destination.

The schema 100 could also include an identifier for the airline as indicated at 112 and could also include further flight characteristics such as whether Kosher meals are served on the flight (as indicated at 114), whether the available seat is an aisle or window seat, and so on. The preferred schema could also include further details of individual flights.

It will be appreciated that the reference database could include further details of airline flights and could additionally include details of other methods of transportation, for example train or boat.

The reference database 44 comprises one or more travel data sets, each travel data set identified by the identifier 102 and representing an option for travel from an origin 104 to a destination 106.

Figure 4:
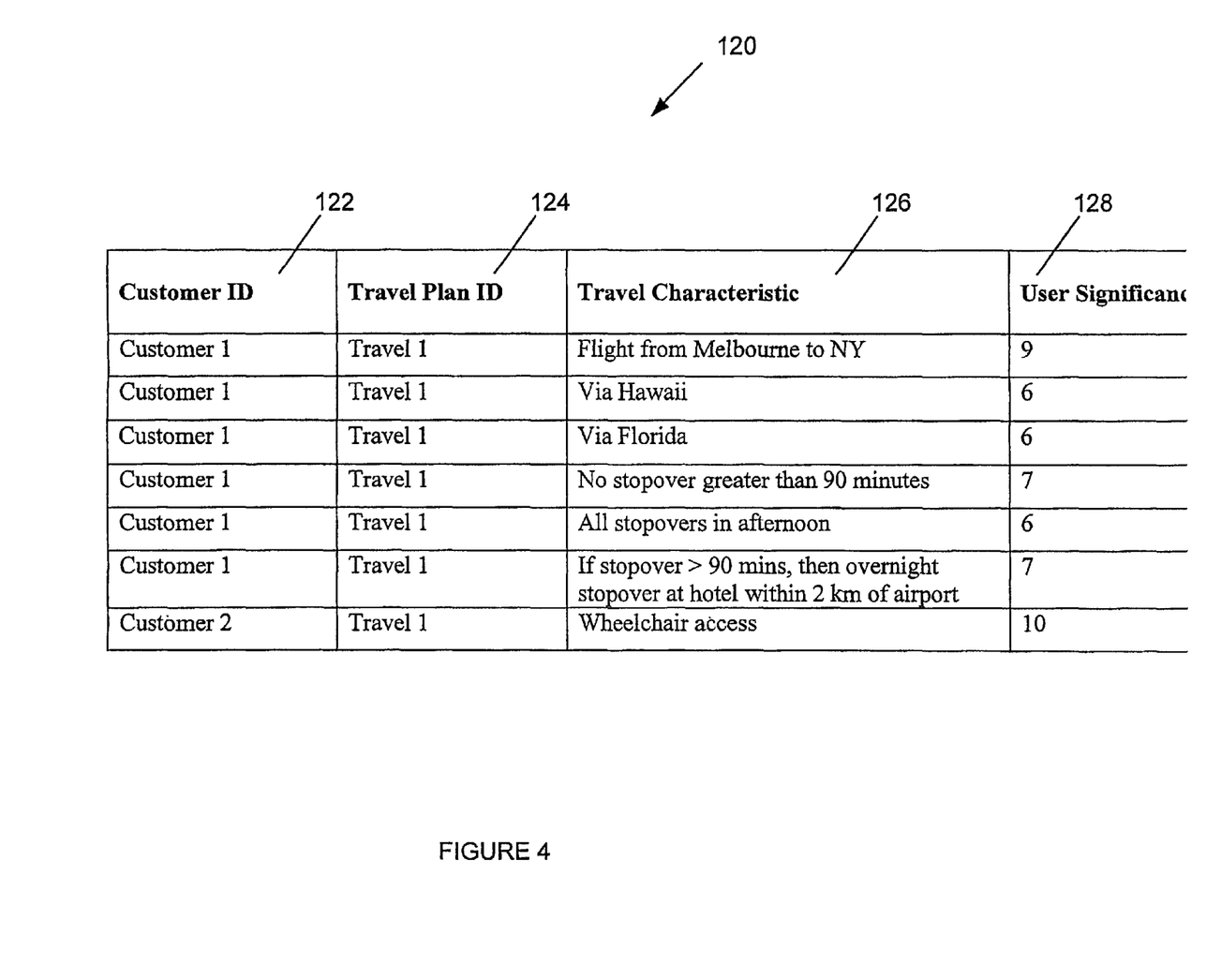
FIG. 4 is a preferred database schema for the user preferences database.

FIG. 4 illustrates a conceptual schema 120 for the user preferences database 46. As indicated, the preferred database 46 comprises one or more preference data sets, each data set identified by, for example, a customer identifier 122 and a travel plan identifier 124.

The user preferences could be as follows:

"What combination of flights can fly me from Melbourne to New York via Hawaii and Florida with a minimum of stops, serve Kosher dairy-free in-flight meals, and any stops that are required fall in the afternoon and are no longer than 90 minutes, with a minimal number of different airlines?"

Each data set shown in FIG. 4 represents one or more preferences of the specified customer on a specified travel plan, for example stopover locations of Hawaii and Florida, and maximum stopover lengths of 90 minutes.

The schema 120 includes a description of travel characteristics as indicated at 126. For example the customer may wish to fly from Melbourne to New York and the origin and ultimate destination together form one travel characteristic of the travel plan.

Each characteristic is also assigned a user significance value as indicated at 128. It will be appreciated that any suitable number system could be used and that the number system shown in FIG. 4 is for the purposes of illustration only. Each characteristic could be assigned a penalty of 0 (not important) to 10 (important), with various values in between. One example of a relatively low penalty is that the customer may wish to fly from Melbourne to New York through Hawaii and Florida. The preferences "via Hawaii" and "via Florida" could be assigned a lower penalty, for example 6. If the customer requires wheelchair access to any facilities, this would presumably be an essential preference and would be assigned a high penalty, for example 10.

Each travel characteristic essentially represents an inconvenience associated with a particular travel plan. Such travel characteristics include the number of stopovers, the timing of stopovers, the duration of stopovers, the unavailability of particular meals on flight, and so on. The user significance user value is an indicator of how significant a particular inconvenience is to a user. In practice, the user preferences database could be implemented in a relational database with a Customer table representing customer data and an Inconvenience table representing the particular inconveniences of certain travel plans. A third table could link customer and inconvenience data pairs together with a penalty value.

Figure 5:
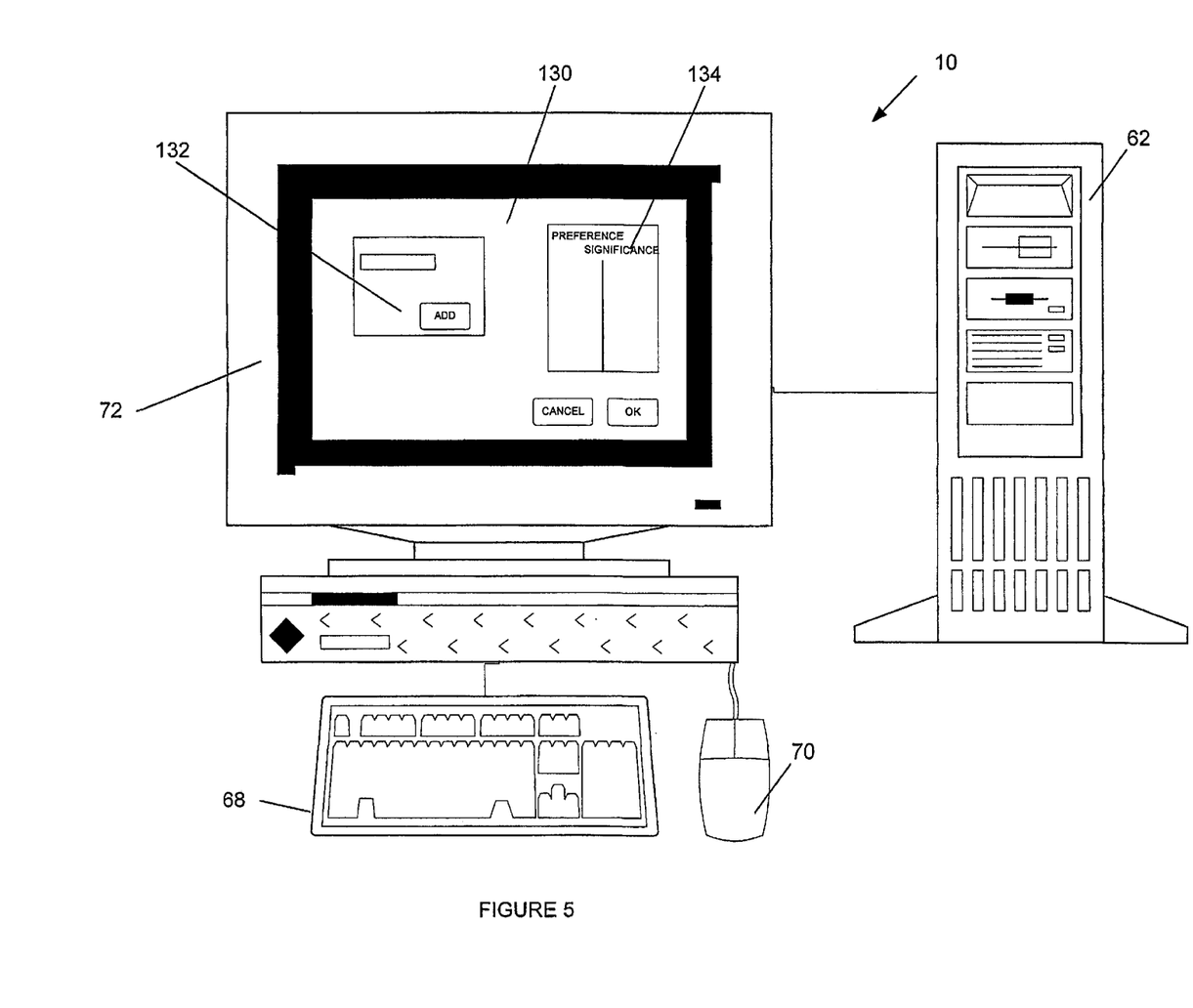
FIG. 5 illustrates the data input device of the invention.

Referring to FIG. 5, the system 2 also includes a data entry component which is arranged to obtain the preferences for a travel plan from a particular user. The user preferably operates a data entry component for example a suitable client workstation 10 having a central processor 62, keyboard 68, pointing device 70 and display device 72 as discussed above. The data input device is preferably arranged to display a series of windows to the user as shown at 130. These windows could comprise one or more data entry forms.

The windows shown to the user could include a preference entry window 132 and a further window 134 showing preferences selected by a user and the significance values assigned to those preferences.

The user would enter individual preferences into window 132 and then instruct the data input device to add the new preference to window 134. Each preference is assigned a significance value by the user and the list of preferences is preferably ordered by significance value. As the user alters values assigned to a particular preference, the list of preferences is reordered in the window 134.

It is envisaged that the particular method of collecting data from the user could be performed using any suitable technique. For example, the user could simply enter individual preferences or all preferences together as a "free-form" query into a data entry form. The system could include a natural language processor to parse and analyse the user preferences. Alternatively, the system could provide the user with options selectable from a list. A further alternative could be presenting options to a user and allowing the user to select these options using for example a touch sensitive screen.

Once the user has entered all the necessary preferences, the list of preferences shown in window 134 could be added to the user preferences database 46, or could simply be stored in a memory in workstation 10.

Figure 6:
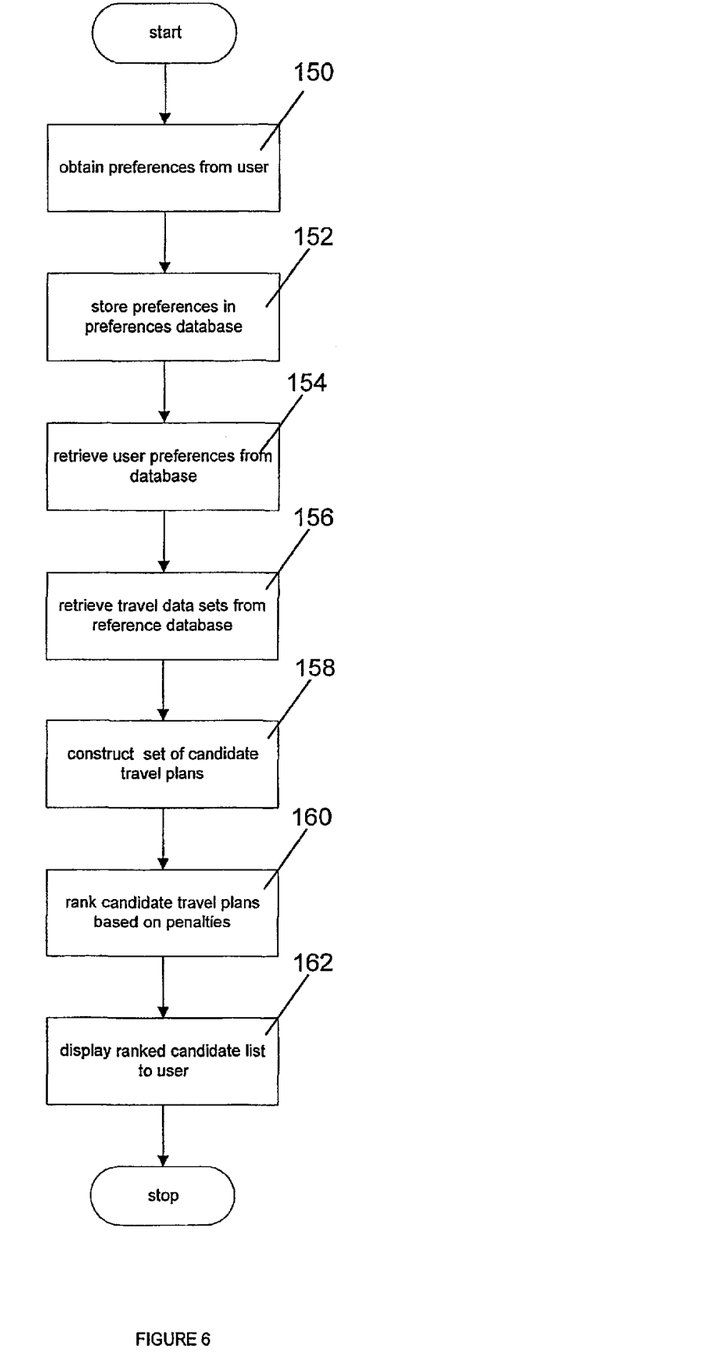
FIG. 6 is a preferred form flowchart of the invention.

FIG. 6 is a flow diagram showing the preferred operation of the system. As indicated at 150, the preferences of a user for a travel plan are obtained from the user. The user preferences may then be stored in the user preferences database as indicated at 152.

As shown at 154, the rules engine 42 retrieves user preferences from the user preferences database 46 and retrieves travel data sets from the reference database as indicated at 156. The system could include a retrieval user query or a retrieval component comprising a workstation programmed to execute a suitable user query.

With the user preferences retrieved from step 154 and the travel data sets retrieved from 156, the system constructs a set of candidate travel plans as indicated at 158. It is envisaged that the steps of retrieving user preferences from a database and retrieving travel data sets from the reference database could be performed in tandem and repeatedly so as to eliminate spurious results and to remove clearly inappropriate travel plans from the candidate list.

Preferably the system constructs candidate travel sets "end on end" so as to form one or more candidate travel plans from a series of connected travel sets.

As indicated at 160, these candidate travel plans are ranked based on individual weightings of the user preferences using a fuzzy logic technique described below. The candidate list of travel plans constructed from the preferences of FIG. 4 by the step of 158 could be as follows:

1. Flight from Melbourne to New York with stopovers in Honolulu, Los Angeles (4 hours) and Fort Lauderdale, with Kosher meals unavailable between Melbourne and Hawaii, no stopovers during the afternoon and travelling with two different airlines.

2. Flight from Melbourne to New York with stopovers in Fiji (3.5 hours), Honolulu, Los Angeles (2 hours), Texas (1.5 hours) and Fort Lauderdale with three different airlines, and Kosher meals unavailable between Melbourne and Hawaii and only the Fiji stopover occurring during the afternoon.

3. Flight from Melbourne to New York with stopovers in Honolulu, Los Angeles (6 hours), Georgia (80 minutes) and Fort Lauderdale, with no Kosher meals, the Georgia stopover during the afternoon, all flying with one airline.

Some preferences could be removed entirely from a proposed itinerary if doing so makes one or more other preferences much closer to the itinerary preferences. For example, the preference "I want an aisle or window seat", may be disregarded to comply with the preference "I want to arrive in Wellington by 9.00 am on Tuesday".

The list of candidate travel plans is preferably ranked based upon a fuzzy logic technique of evaluating how far each candidate travel plan departs from the preferences of the user.

A penalty calculating function assigns a penalty value to each travel data set based on user travel preferences. For example, a travel plan which includes a stopover between travel data sets could result in one penalty point per hour of stopover or two penalty points per hour if the stopover occurs at night or if otherwise inconvenient to the user. The penalty calculating function could also assign two penalty points for changing an airline depending on the difficulty of changing an airline in the particular airport in which the change is scheduled to occur. The penalty calculating function assigns high penalties to travel characteristics having a high user significance. The system could include a penalty calculator comprising a processor arranged to execute the penalty calculating function.

Figure 7:
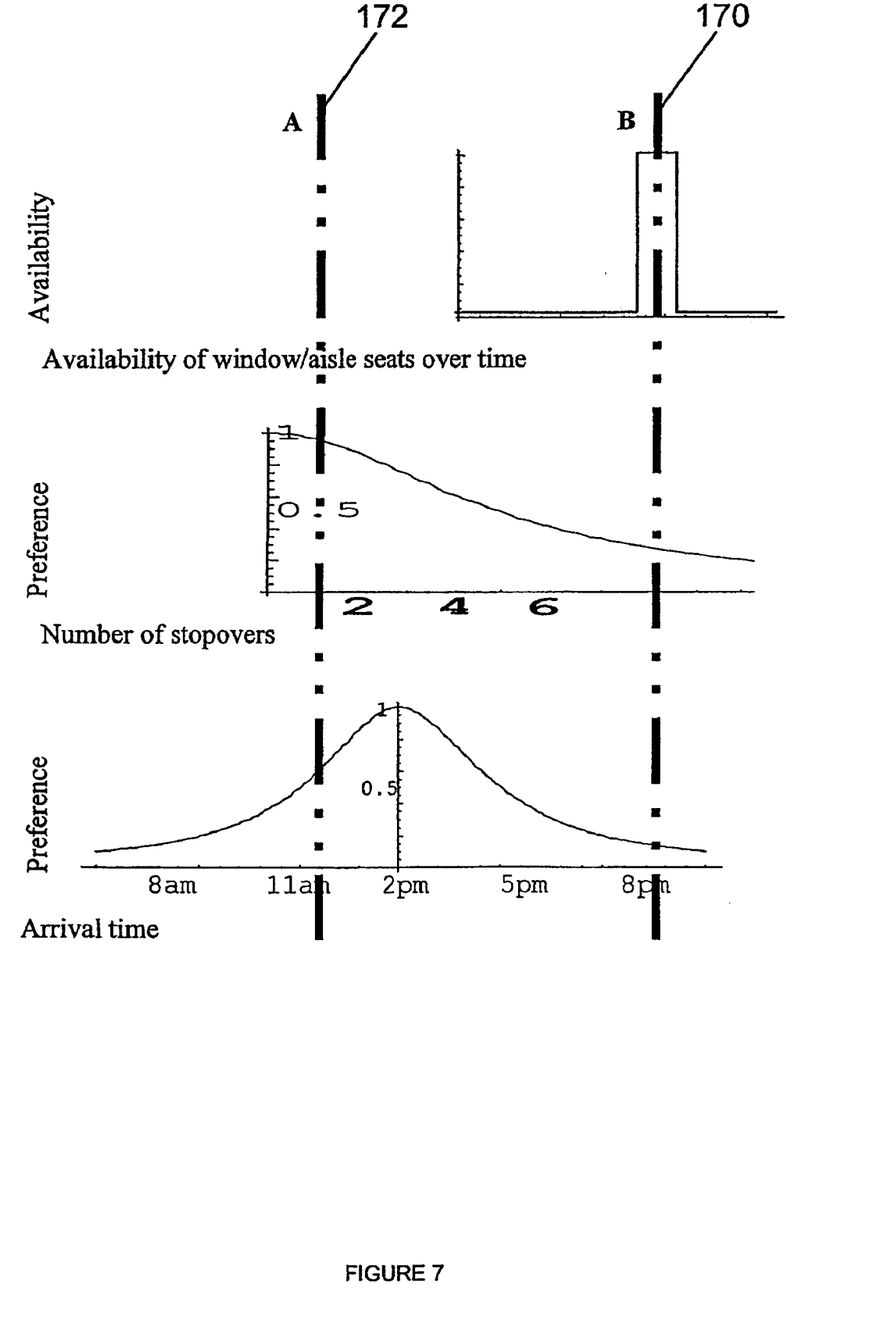
FIG. 7 illustrates a preferred method of evaluating possible itineraries.

The preferred ranking process is illustrated graphically with reference to FIG. 7. The preferences are preferably shown as a series of curves, with the peak of the curves corresponding to the preference and availability for that preference, across some other value for example time, the cost of fare, the number of stopovers, etc.

In FIG. 7, a partial travel plan is selected by finding the vertical line which best fits the preferences and availability for a particular preference. The line indicated at 170, for example, shows a poor match for the number of stopovers and arrival time. The line indicated at 172, on the other hand, shows a good match for the same two preferences. The options indicated by lines 170 and 172 could both be listed as possible travel plans, and ranked according to the weightings given to each rule.

Typical user preferences could also include the following:

1. I want to go to meetings in Cambridge on day XXX, Bristol on day YYY, Basel and Berne between dates AAA and BBB, Tokyo on day WWW and Paris on day ZZZ. I want the entire trip to cover no more than 8 days, and I want the hotels I stay at to be no more than 2 km from my meetings (list provided) and no more than half an hours drive from the relevant airport. My travel budget is $CCC, but I am happy to extend that by 10–20% to make sure that no stopover is longer than 90 mins, but I won't pay more than that. What are my travel options?

2. What combination of first class scenic train journeys will take me from Normandy to Mumbai, staying only at 5 star hotels within 2 kms of a train station, and taking no longer than 28 days.

Figure 8:
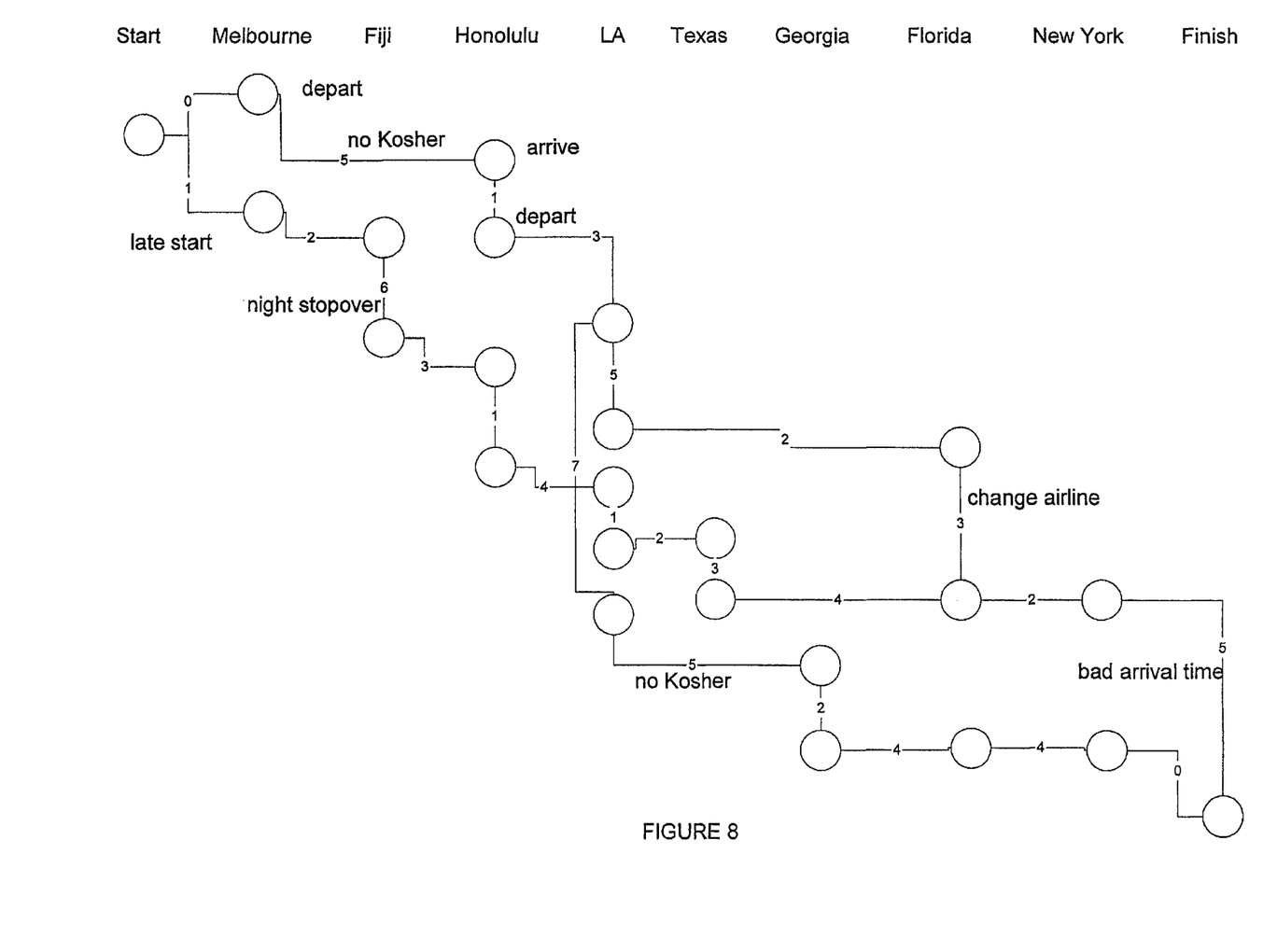
FIG. 8 shows another preferred method of evaluating possible itineraries as a network model.

FIG. 8 illustrates another preferred method in which the selection algorithm, or the selection component on which the selection algorithm is running, is arranged to operate. The selection indicates travel from Melbourne to New York, taking into account the availability or unavailability of Kosher-type meals, later start times, overnight stopovers, etc. Each travel data set is assigned a penalty value by the above penalty calculating function or penalty calculator. The selection algorithm then selects the best candidate travel plan(s) using for example Dijkstra's algorithm to find a path through the network with the smallest sum of penalty values.

Figure 9:
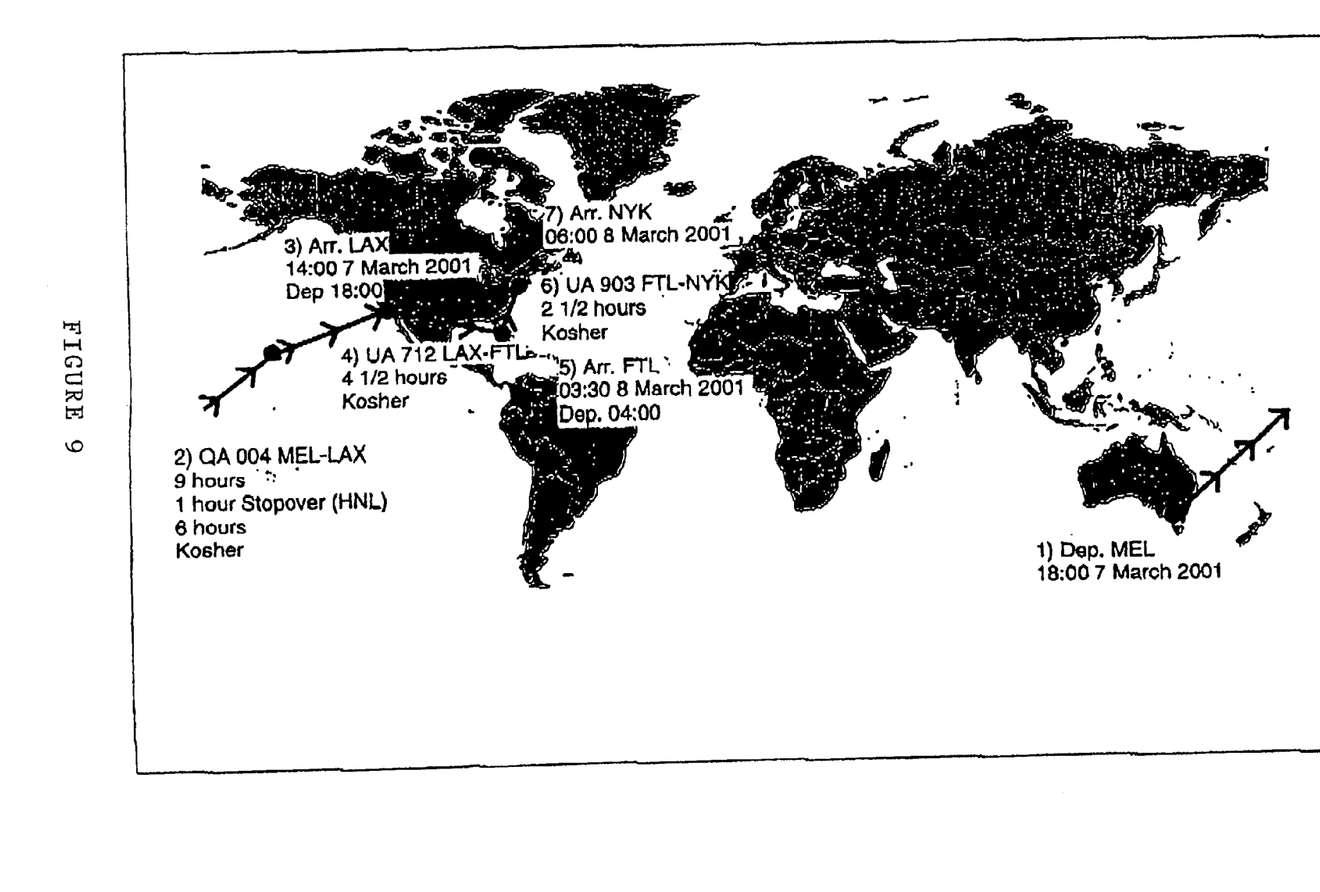
FIGS. 9 and 10 illustrate a preferred format for displaying candidate travel plans
Figure 10:
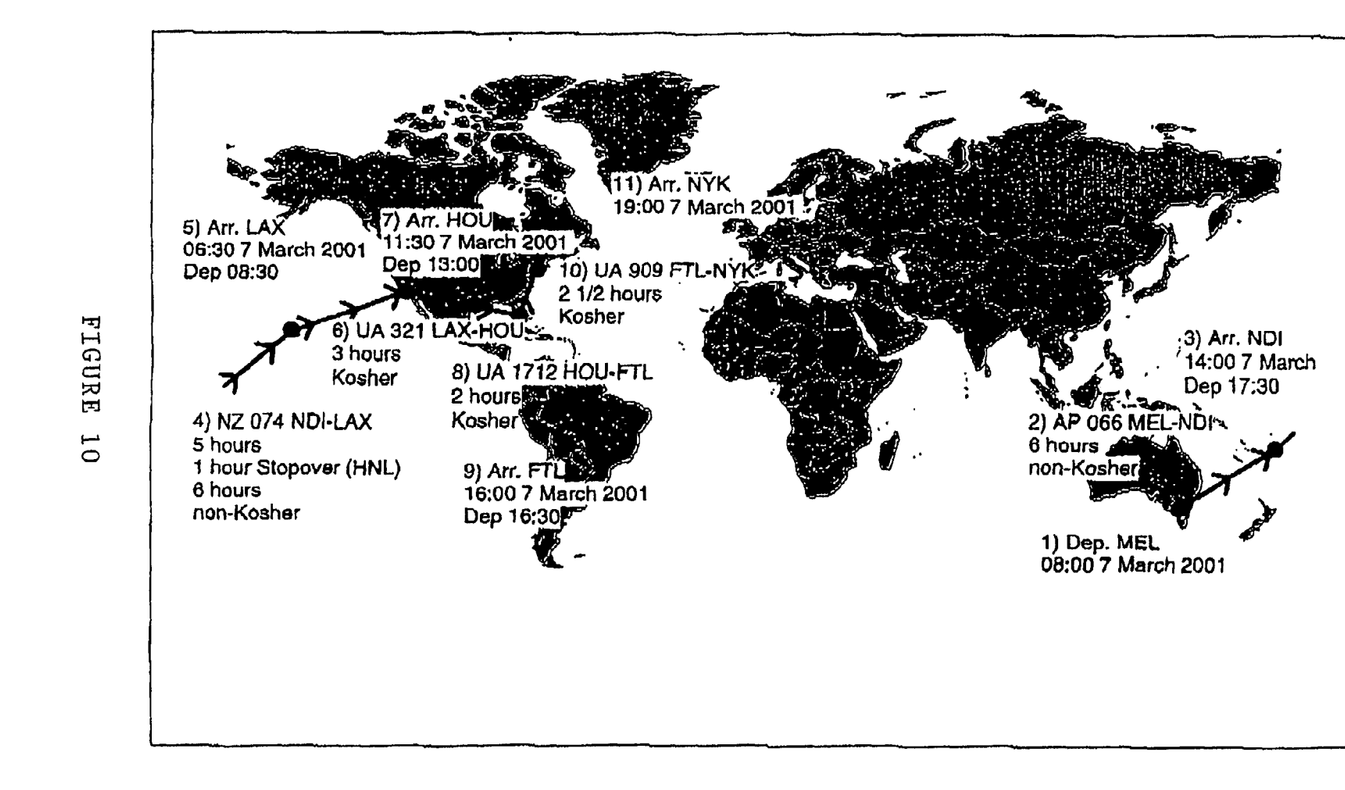

Referring to FIGS. 9 and 10, candidate travel plans are preferably displayed to a user on a display device by superimposing on a world map text and graphics representing each candidate travel plan.

FIG. 9, for example, shows one example candidate travel plan instructed from the preferences of FIG. 4 by the step of 158. The candidate travel plan involves a Qantas flight from Melbourne to Los Angeles with a 1 hour stopover in Honolulu, a 4½ hour stopover in Los Angeles followed by a United Airlines flight from Los Angeles to Fort Lauderdale, a 2.5 hour stop in Fort Lauderdale followed by a United Airlines flight to New York.

FIG. 10 illustrates a further candidate travel plan involving an Air New Zealand flight from Melbourne to Los Angeles with a 3.5 hour stopover in Fiji and a 1 hour stopover in Honolulu. The travel plan then specifies a 2 hour stopover in Los Angeles followed by a United Airlines flight to Texas, a 2 hour stopover in Texas then a United Airlines flight to Fort Lauderdale then a United Airlines flight to New York.

The foregoing describes the invention including preferred forms thereof. Alterations and modifications as will be obvious to those skilled in the art are intended to be incorporated within the scope hereof, as defined by the accompanying claims.

What is claimed is:

1. A method of planning a travel route, comprising the steps of:

maintaining in computer memory a reference database comprising a plurality of travel data sets, at least one travel data set representing a travel option from a travel origin to a travel destination and comprising an origin identifier and a destination identifier;

obtaining one or more travel preferences for a travel route from a user, at least one travel preference including a user significance value;

retrieving one or more travel data sets from the reference database to construct one or more candidate travel plans substantially complying with the travel preference(s);

calculating penalty values based on the user travel preferences for respective travel data sets in the candidate travel plans;

ranking the candidate travel plans based on the sum of the penalty values associated with the travel data sets of respective candidate travel plans; and displaying the ranked candidate travel plans to a user.

2. A method of planning a travel route as claimed in claim 1, wherein the step of calculating the penalty values further comprises the steps of calculating each penalty value as a function of the user significance value for each travel preference.

3. A method of planning a travel route as claimed in claim 1, further comprising the step of maintaining in computer memory a user preferences database comprising one or more user preference data sets representing one or more user preferences for a user travel route.

4. A method of planning a travel route as claimed in claim 3, further comprising the step of storing the travel preferences obtained from a user as one or more user preference data sets in the user preference database.

5. A method of planning a travel route as claimed in claim 1 wherein the travel preferences include an origin and a destination.

6. A method of planning a travel route as claimed in claim 1 wherein the travel preferences include a stopover site.

7. A method of planning a travel route as claimed in claim 1 wherein the travel preferences include a maximum stopover time.

8. A method of planning a travel route as claimed in claim 1 wherein the travel preferences include maximum number of stopovers.

9. A method of planning a travel route as claimed in claim 1 wherein the travel preferences include a time preference for one or more stopovers.

10. A method of planning a travel route as claimed in claim 1 wherein the travel preferences include a disability requirement.

11. A travel route planner, comprising:
   a reference database maintained in computer memory, the reference database comprising a plurality of travel data sets, at least one travel data set representing a travel option from a travel origin to a travel destination and comprising an origin identifier and a destination identifier;
   a data entry component configured to obtain one or more travel preferences for a travel route from a user, at least one travel preference including a user significance value;
   a retrieval component configured to retrieve one or more travel data sets from the reference data base to construct one or more candidate travel plans substantially complying with the travel preference(s);
   a penalty calculator configured to calculate a plurality of penalty values based on the user travel preferences for respective travel data sets in the candidate travel plans; and
   a display configured to rank the candidate travel plans based on the sum of the penalty values associated with the travel data sets of respective candidate travel plans and to display the ranked candidate travel plans to a user.

12. A travel route planner as claimed in claim 11 wherein the penalty calculator is configured to calculate each penalty value as a function of the user significance value for each travel preference.

13. A travel route planner as claimed in claim 11 further comprising a user preferences database maintained in computer memory, the user preferences database comprising one or more user preference data sets representing one or more user preferences for a user travel route.

14. A travel route planner as claimed in claim 13 wherein the data entry component is configured to store the travel preferences obtained from a user as one or more user preference data sets in the user preference database.

15. A travel route planner as claimed in claim 11 wherein the travel preferences include an origin and a destination.

16. A travel route planner as claimed in claim 11 wherein the travel preferences include a stopover site.

17. A travel route planner as claimed in claim 11 wherein the travel preferences include a maximum stopover time.

18. A travel route planner as claimed in claim 11 wherein the travel preferences include maximum number of stopovers.

19. A travel route planner as claimed in claim 11 wherein the travel preferences include time preference for one or more stopovers.

20. A travel route planner as claimed in claim 11 wherein the travel preferences include a disability requirement.

21. A travel route planner computer program, comprising:
   a reference database maintained in computer memory, the reference database comprising a plurality of travel data sets, at least one travel data set representing a travel option from a travel origin to a travel destination and comprising an origin identifier and a destination identifier;
   a data entry form programmed to obtain one or more travel preferences for a travel route from a user, at least one travel preference including a user significance value;
   a retrieval query programmed to retrieve one or more travel data sets from the reference database to construct one or more candidate travel plans substantially complying with a travel preference(s);
   a penalty calculation function programmed to calculate a plurality of penalty values based on the user travel preferences for respective travel data sets in the candidate travel plans; and
   a display programmed to rank the candidate travel plans based on the sum of the penalty values associated with the travel data sets of respective candidate travel plans and to display the ranked candidate travel plans to a user.

22. A travel route planner computer program as claimed in claim 21 wherein the penalty calculation function is programmed to calculate each penalty value as a function of the user significance value for each travel preference.

23. A travel route planner computer program as claimed in claim 21 further comprising a user preferences database maintained in computer memory, the user preferences database comprising one or more user preference data sets representing one or more user preferences for a user travel route.

24. A travel route planner computer program as claimed in claim 23 wherein the data entry form is programmed to store the travel preferences obtained from a user as one or more user preference data sets in the user preference database.

25. A travel route planner computer program as claimed in claim 21 wherein the travel preferences include an origin and a destination.

26. A travel route planner computer program as claimed in claim 21 wherein the travel preferences include a stopover site.

27. A travel route planner computer program as claimed in claim 21 wherein the travel preferences include a maximum stopover time.

28. A travel route planner computer program as claimed in claim 21 wherein the travel preferences include maximum number of stopovers.

29. A travel route planner computer program as claimed in claim 21 wherein the travel preferences include a time preference for one or more stopovers.

30. A travel route planner computer program as claimed in claim 21 wherein the travel preferences include a disability requirement.

31. A travel route planner computer program as claimed in claim 21, embodied on a computer readable medium.

* * * * *